US008274565B2

(12) United States Patent  (10) Patent No.: US 8,274,565 B2
Gorian et al.  (45) Date of Patent: Sep. 25, 2012

(54) SYSTEMS AND METHODS FOR CONCEALED OBJECT DETECTION

(75) Inventors: Izrail Gorian, Watertown, MA (US); Galina Doubinina, Watertown, MA (US)

(73) Assignee: Iscon Video Imaging, Inc., Woburn, MA (US)

( * ) Notice: Subject to any disclaimer, the term of this patent is extended or adjusted under 35 U.S.C. 154(b) by 393 days.

(21) Appl. No.: 12/648,518

(22) Filed: Dec. 29, 2009

(65) Prior Publication Data

US 2010/0165111 A1   Jul. 1, 2010

Related U.S. Application Data

(60) Provisional application No. 61/141,745, filed on Dec. 31, 2008.

(51) Int. Cl.
*H04N 5/33* (2006.01)
(52) U.S. Cl. .................. 348/164; 348/162
(58) Field of Classification Search .............. 348/162, 348/164
See application file for complete search history.

(56) References Cited

U.S. PATENT DOCUMENTS

| | | | |
|---|---|---|---|
| 3,971,065 | A | 7/1976 | Bayer |
| 2003/0163042 | A1 | 8/2003 | Salmon |
| 2007/0122038 | A1 | 5/2007 | Gorian et al. |
| 2007/0145273 | A1 | 6/2007 | Chang |
| 2008/0144885 | A1 | 6/2008 | Zucherman et al. |
| 2008/0284636 | A1* | 11/2008 | Hausner et al. ............. 342/22 |
| 2009/0060315 | A1* | 3/2009 | Harris et al. .............. 382/141 |

FOREIGN PATENT DOCUMENTS

| | | |
|---|---|---|
| WO | 2006093755 A2 | 9/2006 |
| WO | 2010078410 A2 | 7/2010 |

OTHER PUBLICATIONS

Kemp, M.C., "Millimetre wave and terahertz technology for the detection of concealed threats—a review", Proc. of SPIE vol. 6402 (Optics and Photonics for Counterterrorism and Crime Fighting II), Sep. 28, 2006.
Notification of Transmittal of the International Search Report and the Written Opinion of the International Searching Authority, or the Declaration, International Application No. PCT/US2009/069798, filed on Dec. 30, 2009.
Liapis, S., et al., "Colour and texture segmentation using wavelet frame analysis, deterministic relaxation and fast marching algorithms." J. Vis. Commun. Image R. 15 (2004) 1-26.

(Continued)

*Primary Examiner* — Mohamed Wasel
(74) *Attorney, Agent, or Firm* — Burns & Levinson, LLP; Orlando Lopez, Esq.

(57) ABSTRACT

In the method disclosed, three or more infrared images of a body having concealed objects are acquired, each image resulting in a response of a detector having a spectral sensitivity in the infrared that is analogous to one of the spectral sensitivities of the color response of the human eye, and each image corresponding to a different spectral sensitivity. At least the center of the spectral sensitivity corresponding to the Green response at the human eye is selected to allow increasing the detected radiation difference between the concealed object and the body. The responses of the detector to each of the three or more images are utilized to provide RGB signals to a display device. The color image displayed in the display device allows identifying the concealed object.

17 Claims, 10 Drawing Sheets

OTHER PUBLICATIONS

Kervrann, C. and Heitz, F., "A Markov random field model based approach to unsupervised texture segmentation using local and global spatial statistics," IEEE Transactions on Image Processing, vol. 4, No. 6, 1995, 856-862, http://citeseer.ist.psu.edu/kervrann93markov.html, which is incorporated by reference herein in its entirety.

Pratt, W. K., "Sensor tristimulus value estimation." In Digital Image Processing, ISBN0-471-01888-0, (NY: John Wiley & Sons), pp. 457-461 (1978).

Pratt, W. K., "Histogram modification." In Digital Image Processing, ISBN0-471-01888-0, (NY: John Wiley & Sons), pp. 311-318 (1978).

Trier, Ø.D. and Taxt, T., "Evaluation of binarization methods for document images," available at http://citeseer.nj.nec.com/trier95evaluation.html, also a short version published in IEEE Transaction on Pattern Analysis and Machine Intelligence, 17, pp. 312-315, 1995.

Motwani, M., et al., "Survey of image denoising techniques," in Proceedings of GSPx 2004, Sep. 27-30, 2004, Santa Clara Convention Center, Santa Clara, CA.

Nevatia, R., "Image segmentation, chapter 9," in Handbook of Pattern Recognition and Image Processing, (NY: Academic Press, Inc.) pp. 215-231 (1986), ISBN 0-121-774560-2, which is incorporated by reference herein in its entirety.

Keyes, L. and Winstanley, A. C., "Using moment invariants for classifying shapes on large_scale maps." Computers, Environment and Urban Systems 25 (2001). available at http://eprints.may.ie/archive/00000064/.

Torres, R., "A graph-based approach for multiscale shape analysis." Pattern Recognition, 37(6):1163--1174, 2004, available at http://citeseer.ist.psu.edu/torres03graphbased.html.

Scheunders, P., "Denoising of multispectral images using wavelet thresholding." Proc. of the SPIE Image and Signal Processing for Remote Sensing IX, 2003, p. 28-35.

Coleman, G.B, and Andrews, H.C., "Image segmentation by clustering," Proc. of the IEEE, vol. 67, Issue 5, May 1979 pp. 773-785.

Lucchese, L., and Mitra, S.K, "Unsupervised segmentation of color images based on k-means clustering in the chromaticity plane," Proc. IEEE Workshop on Content-Based Access of Image and Video Libraries, 1999 (CBAIVL '99), 1999, pp. 74-78.

Wyszecki, G. and Stiles, W.S., "Color science: concepts and methods, quantitative data and formulae," (2nd ed. ed.), pp. 121-125. New York: Wiley Series in Pure and Applied Optics. ISBN 0-471-02106-7 (1982).

Hunt, R. W. G., "The reproduction of colour," Chichester UK: Wiley—IS&T Series in Imaging Science and Technology, pp. 11-12. (6th ed. ed.), ISBN 0-470-02425-9, (2004).

Coleman, G.B. and Andrews, H.C., "Image segmentation by clustering," Proceedings of the IEEE, vol. 67, Issue 5, May 1979 pp. 773-785.

Lucchese, L. and Mitra, S.K, "Unsupervised segmentation of color images based on k-means clustering in the chromaticity plane," Proceedings. IEEE Workshop on Content-Based Access of Image and Video Libraries, 1999 (CBAIVL '99), 1999, pp. 240-244.

\* cited by examiner

Fig.5 Body is out of ROI (Object is not visible)

Fig.6 Object becomes visible inside ROI

Fig. 7 Input raw temperature image. Object is not visible.

Fig. 8 Temperature detector works. Object is visible.

SYSTEMS AND METHODS FOR CONCEALED OBJECT DETECTION

CROSS REFERENCE TO RELATED APPLICATIONS

This application claims priority of U.S. Provisional Application 61/141,745, entitled "SYSTEMS AND METHODS FOR CONCEALED OBJECT DETECTION," filed on Dec. 31, 2008, which is incorporated by reference herein in its entirety for all purposes.

BACKGROUND

These teachings relate generally to detecting concealed objects, and, more particularly, to detecting concealed objects utilizing radiation in a predetermined range of wavelengths.

An infrared camera can see the environment based on temperature difference between neighbor elements of the image. For example, cold object on the warm background could be seen on the monitor connected to the infrared camera as black spot on the white background. An Object under cloth also could be visible if object is cold enough compared to the body temperature. If the object under cloth is in contact with the cloth for a sufficiently long period of time, the body transfers heat to the cloth and the object and eventually the object will be almost indistinguishable (invisible) or more accurately, the object is losing its visibility or contrast in the infrared. The less sensitive an infrared device, the faster the object loses its visibility.

However, temperature between the object and cloth background will never be theoretically equal because of different thermal conductivity of an object and cloth. A temperature difference exists even the object on the body is located for any length of time. This difference could be negligible for today's devices to reveal such objects under cloth. For example, advanced cameras with thermal resolution not better than 20 mK cannot see real objects under the cloth if the object is in contact with the body for about 10 minutes or more.

BRIEF SUMMARY

In one embodiment, the system of these teachings includes an image acquisition subsystem receiving electromagnetic radiation from a body, a spectral decomposition subsystem separating the received electromagnetic radiation into at least three components, each one component of three of the at least three components corresponding to a response to a non-visible analogue to one human vision spectral response from three human vision spectral responses and an analysis subsystem receiving the at least three components, identifying at least one region in an image obtained from at least one the at least three components and providing a color image, the color image obtained from a visible equivalent of the non-visible analogue; the at least one region of the color image enabling detection of a concealed object.

In one embodiment, the electromagnetic radiation is in the infrared range and in practicing the method of these teachings, three infrared images of a body having concealed objects are acquired, each image resulting in a response of a detector having a spectral sensitivity in the infrared that is analogous to one of the spectral sensitivities of the color response of the human eye, each image corresponding to a different spectral sensitivity. At least the center of the spectral sensitivity corresponding to the Green response at the human eye (or the corresponding tristimulus response) is selected to allow increasing the detected radiation difference between the concealed object and the body. The responses of the detector to each of the three images are utilized to provide RGB signals to a display device (a monitor in one instance). The color image displayed in the display device allows identifying the concealed object.

In another embodiment of the method, the image of substantially the body is extracted from the detected images.

Embodiments of systems that implement the methods of these teachings are also disclosed.

For a better understanding of the present teachings, together with other and further needs thereof, reference is made to the accompanying drawings and detailed description and its scope will be pointed out in the appended claims.

DETAILED DESCRIPTION

Systems with sufficient resolution, having increased resolution compared to conventional systems, that are capable of detecting concealed objects, where the concealed objects have been in contact with a body and have achieved substantial Thermal equilibration with the body, are disclosed herein below.

Embodiments utilizing image processing in order to enhance the contrast in an infrared image of the body and the concealed objects and embodiments utilizing an infrared analogue of the spectral sensitivities of the cone types referred to as blue, green, and red cones, which are related to the tristimulus values in color theory (see, Color Vision, available at http://en.wikipedia.org/wiki/Color_vision#Theories_of_color_visi on; Wyszecki, Günther; Stiles, W. S. (1982). *Color Science: Concepts and Methods, Quantitative Data and Formulae* (2nd ed. ed.). New York: Wiley Series in Pure and Applied Optics. ISBN 0-471-02106-7; R. W. G. Hunt (2004). The Reproduction of Colour (6th ed. ed.). Chichester UK: Wiley-IS&T Series in Imaging Science and Technology. pp. 11-12. ISBN 0-470-02425-9, all of which are incorporated by reference herein in their entirety) are within the scope of these teachings.

The human eye can distinguish about 10 millions of colors (by cones). It is known the eye can distinguish approximately 1000 grey levels (by rods). A color image could be preferable for distinguishing the objects from background. In some conventional systems, a pseudo color approach has been developed: each pixel of grey level image converted to the color based on brightness of the pixel. In those conventional systems, Different color pallets have been designed for different applications sometimes improving the ability to distinguish features but the improvement is not sufficient to distinguish concealed objects and the background. Conversion of gray level value to color has not achieved success in distinguishing concealed objects.

Figure 1:
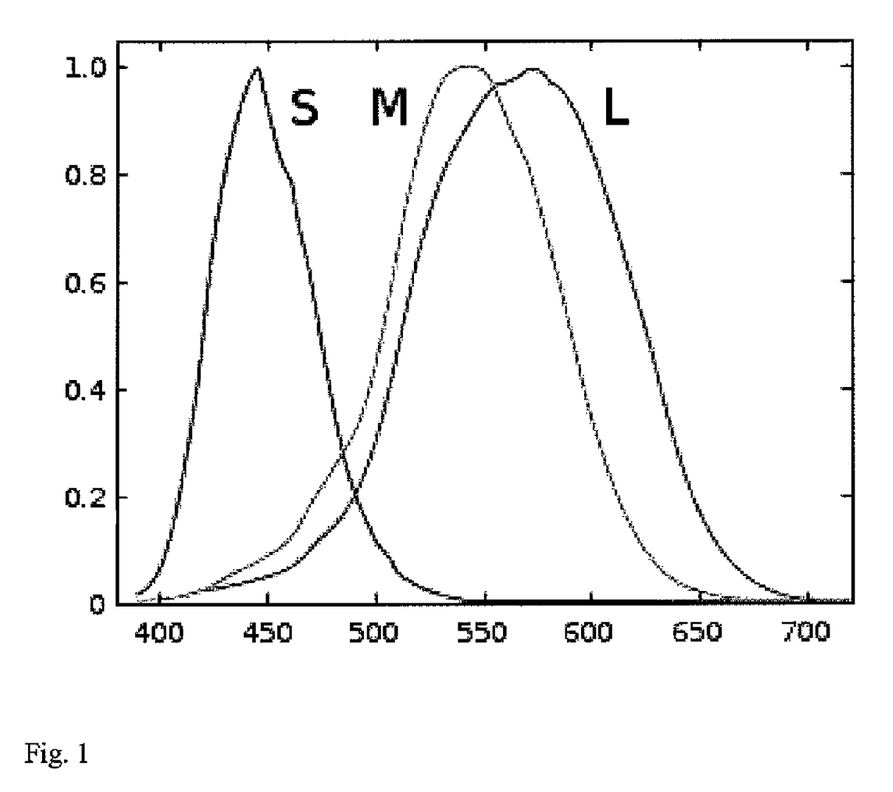
FIG. 1 shows the conventional spectral sensitivities of the of the cones.

In one embodiment of the system and method of these teachings, significant, in one instance hundreds time (not a limitation of these teachings), thermal resolution improvement is achieved by utilizing an infrared analogue of the spectral sensitivities of the cone types (although the spectral decomposition is referred to as the spectral sensitivity of the cone types, other representations of these three components of the human vision spectral response, such as tristimulus values, are also within the scope of these teachings) providing a conversion wavelength to color analogous to the manner in which human eye perceives color. (Responses to transmitted or reflected infrared radiation which are analogous to the response of the human eye are also disclosed in U.S. Pat. No. 5,321,265, issued to Block on Jun. 14, 1994, which is incorporated by reference herein in its entirety.) FIG. 1 shows the conventional spectral sensitivities of the of the cones-short (S), medium (M), and long (L) cone types, also sometimes referred to as blue, green, and red cones). In one embodiment, three infrared filter shapes, analogous to the spectral sensitivities in the human eye (shown in FIG. 2) are utilized. In one instance and in the exemplary embodiment disclosed herein below, far infrared, about 8 to about 14 microns, is used because there are multiple uncooled and relatively inexpensive infrared detectors (cameras) available and the substantial maximum of body radiation is around 9.5 microns. Other infrared or other electromagnetic radiation ranges could be used.

However, it should be noted that the present teachings are not limited to the infrared range. Other embodiments utilizing other frequency ranges of the observed electromagnetic radiation are within the scope of these teachings.

In most instances, an object attached to the human body has less temperature than the body around him. As a result, in those instances, radiation from the object is less than radiation from the body around the object. Based on this characteristic, in one embodiment, spectral decomposition subsystems (filters in the embodiment shown in FIG. 3, these teachings is not being limited only to that embodiment; other spectral decomposition subsystems are within the scope of these teachings) are chosen to increase the radiation differences and distinguish the object better (that is, with the substantially best possible contrast). There are almost no chemical groups in Nature which absorb and then reemit the radiation in the range 10-11 micron. As a result, in the spectral window between 8-14 micron, the object has a substantially minimal radiation in the range 10-11 micron.

Because the human eye is more sensitive to the green color, and the green color is lighter than the blue and red colors, the analogous green filter is chosen as having a maximum around 10.5 microns. The analogous green filter shown in FIG. 2 is shifted somewhat to the left of an exact analogue of the spectral sensitivities of FIG. 1.

Figure 2:
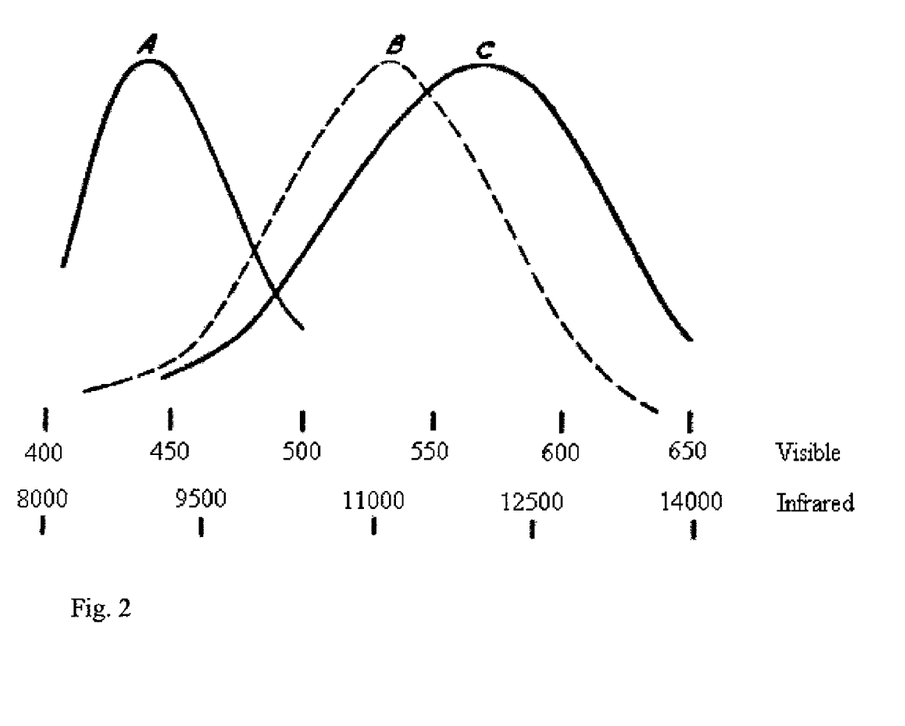
FIG. 2 is a graphical representation of the spectral sensitivities showing a scale of near infrared wavelengths as well as the corresponding visual wavelengths imposed on the X axis.

With the analogue green filter maximum around substantially 10.5 microns and analogue blue-red filters as shown in FIG. 2, around the object on the human body, a camera will observe substantially the whole spectrum of the body radiation. (Although the term "filters" is used herein and below, other methods of achieving the equivalent spectral decomposition are within the scope of these teachings.) All of these three filters will significant contribute to the corresponding images. When provided to the display, the output of the filter in FIG. 2 analogous to the green sensitivity is provided as the green signal in RGB. (For other infrared ranges, the maximum of the analogous green filter is chosen at a wavelength that allows increasing the detected radiation difference between the concealed object and the body.) Similarly the output of the filters analogous to red and blue sensitivities are provided as the red and blue signals in RGB. In one instance, overlay of the images obtained with the different analogous filters would give bright and close to yellow color of the body around the object. At the same time, there would be smallest radiation from the object in the spectral window 10-11 micron with green color and significantly more radiation in the range 8-10 micron with blue color and in the range 11-14 micron with red color. The image obtained by overlay of the three images would have substantially no yellow color and would look significantly darker on the object than body around the object.

Figure 3:
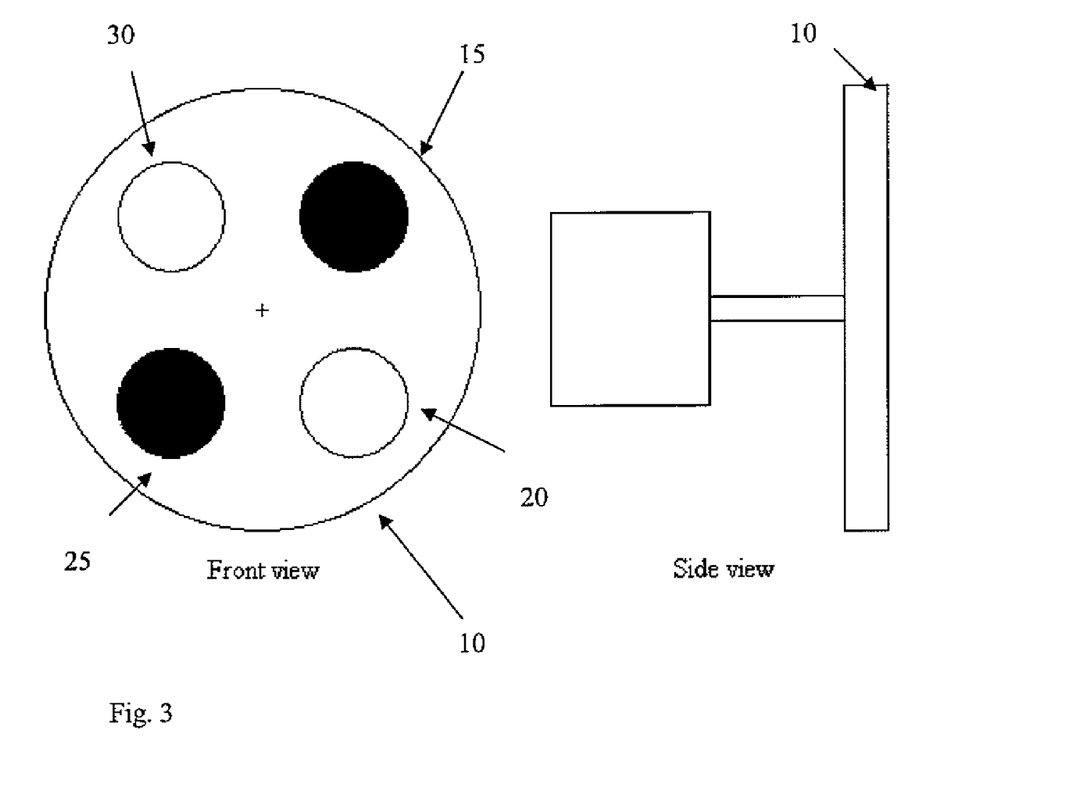
FIG. 3 is a schematic graphical representation of an embodiment of a filter assembly of these teachings.

One embodiment of the filter assembly of these teachings is shown in FIG. 3. Referring to FIG. 3, shown therein is a rotating disk 10 before the infrared camera with three infrared filters (analogous to red 15, analogous to green 20, analogous to blue 25) and a transparent filter 30, in one instance, an empty hole, (to receive raw temperature image). Triplets of images are provided to the computer software that converts infrared triplets to the color image presented to the operator after image processing based on contrast improvement.

Although, in the embodiment shown in FIG. 3, the spectral decomposition subsystem includes the movable (rotating in one embodiment, translation also being within the scope of these teachings) disc with three filters, a number of other embodiments also within the scope of these teachings. In one instance, the color filters can be implemented on the image acquisition device itself, as in the Bayer filters disclosed in U.S. Pat. No. 3,971,065 the image acquisition device (detector) disclosed in US patent application publication 20070145273, entitled "High-sensitivity infrared color camera", or in U.S. Pat. No. 7,138,663, all of which are incorporated by reference herein in their entirety. In other embodiments, a measurement of the spectrum is obtained at a number of pixels using conventional means and each spectrum is decomposed into tri-stimulus values, for example, as disclosed in W. K. Pratt, Digital Image Processing, ISBN0-471-01888-0, pp. 457-461, which is incorporated by reference herein in its entirety.

Figure 4:
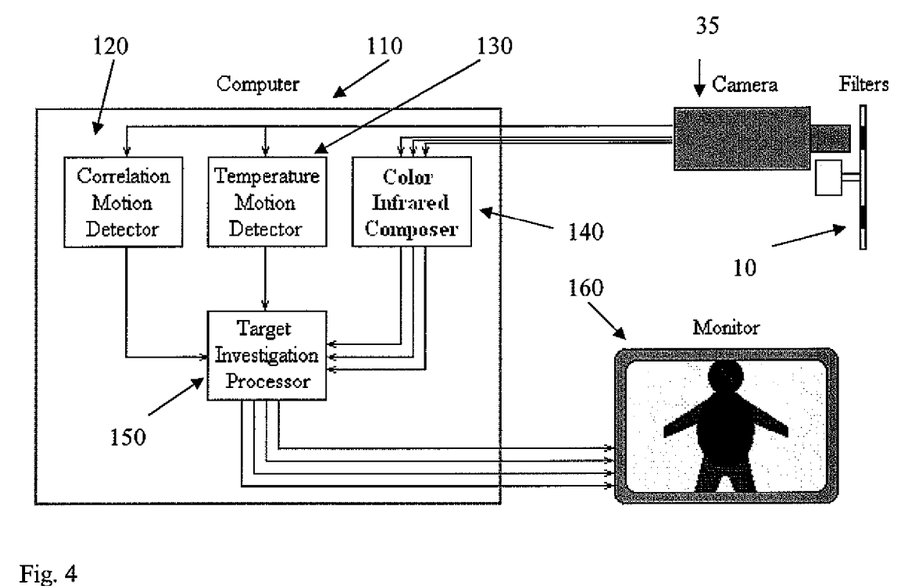
FIG. 4 is a schematic graphical representation of an embodiment of a system of these teachings.

An embodiment of the system of these teachings is shown in FIG. 4. Referring to FIG. 4, four signals are provided by the infrared camera 35, each signal corresponding to an image filtered by one of the four filters, a transparent filter (producing an image referred to as a raw image or raw pixels), and infrared filters analogous to red, green, and blue, as described hereinabove.

The system shown in FIG. 4 includes an image acquisition subsystem 35 receiving electromagnetic radiation from a body, a spectral decomposition subsystem 10 separating the received electromagnetic radiation into at least three components, each one component of three of the at least three components corresponding to a response to a non-visible analogue to one human vision spectral response from three human vision spectral responses and an analysis subsystem 110 receiving the at least three components, identifying at least one region in an image obtained from at least one the at least three components and providing a color image, the color image obtained from a visible equivalent of the non-visible analogue; the at least one region of the color image enabling detection of a concealed object.

In the embodiment shown in FIG. 4, the spectral decomposition subsystem also provides a substantially unattenuated image (such as that obtained by a clear filter and also referred to as a "raw" image) and the electromagnetic radiation detected is in infrared range. The both infrared image pixels are, in one embodiment, provided to two analysis subsystems, referred to as "Motion detectors," 120, 130 based on two principles: correlation and temperature. (It should be noted that motion need not be detected in the subsystems labeled as "motion detectors" 120, 130. The term "motion detector" is used herein for continuity with the priority document. It should also be noted that the use of the term detector in "motion detector" should not be confused with the term detector referring to a device, such as a camera, CCD, etc., used to acquire an image.) Signals from these "detectors" extract an image of a body that has been observed by the image acquisition device and remove the background allowing an increase in contrast of the body and the concealed object.

Three "color" infrared signals are provided to a Color Infrared Composer 140 that creates a color image (corresponding to the three analogous filtered images), as disclosed herein above. In one instance, the color image is a color image of substantially only the extracted body. A Target Investigation Processor 150 sends the extracted part of the color image to the monitor and an observer (operator) can extract or recognize, due to the use of color, the concealed object although there is an almost negligible temperature difference between the concealed object and the body.

Figure 5:
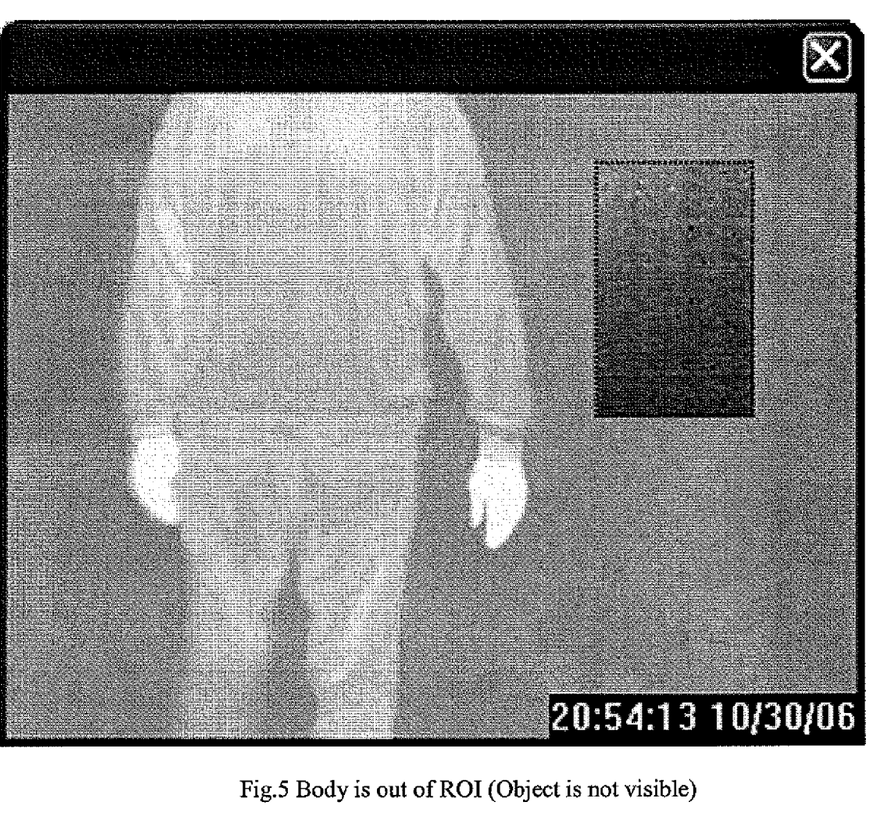
FIGS. 5-8 represents results from an embodiment of the system of these teachings.
Figure 6:
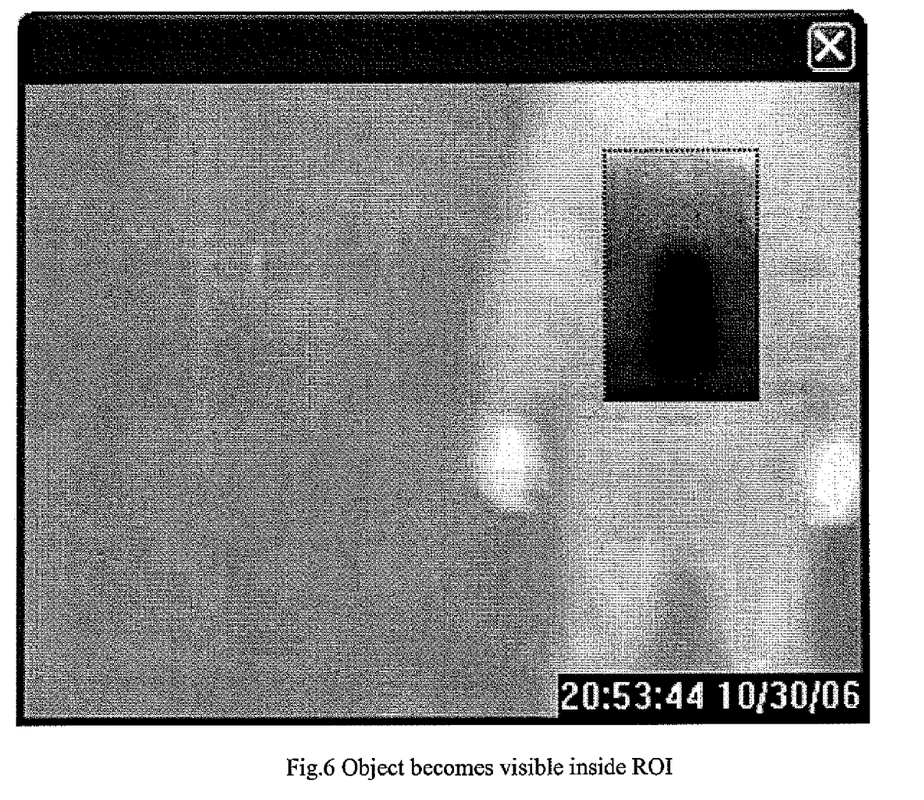

FIGS. 5 and 6 illustrate the results from a Temperature contrastor (internal to the Temperature Motion Detector 130). The concealed Object becomes visible after body is coming under ROI (Region Of Interest) of a Contrast detector. Exemplary embodiments of contrast detection and related image processing techniques can be found in, but not limited to, US Patent publication number 20070122038, Methods and systems for detecting concealed objects, and in WIPO patent publication number WO2006093755, METHODS AND SYSTEMS FOR DETECTING PRESENCE OF MATERIALS, both of which are incorporated by reference herein in their entirety.

Figure 7:
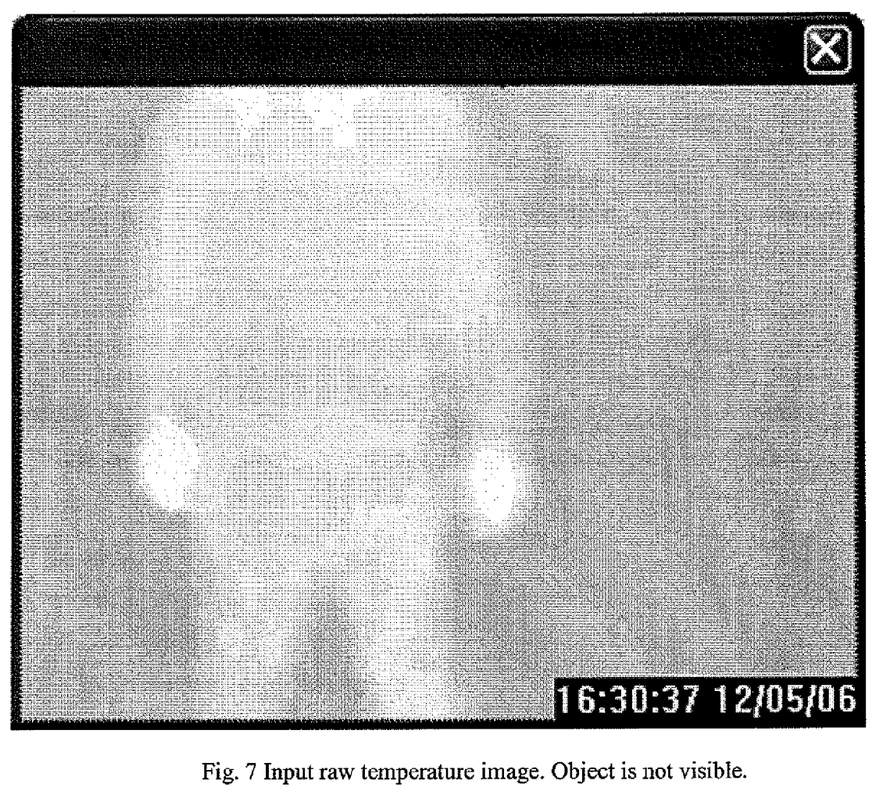
Figure 8:
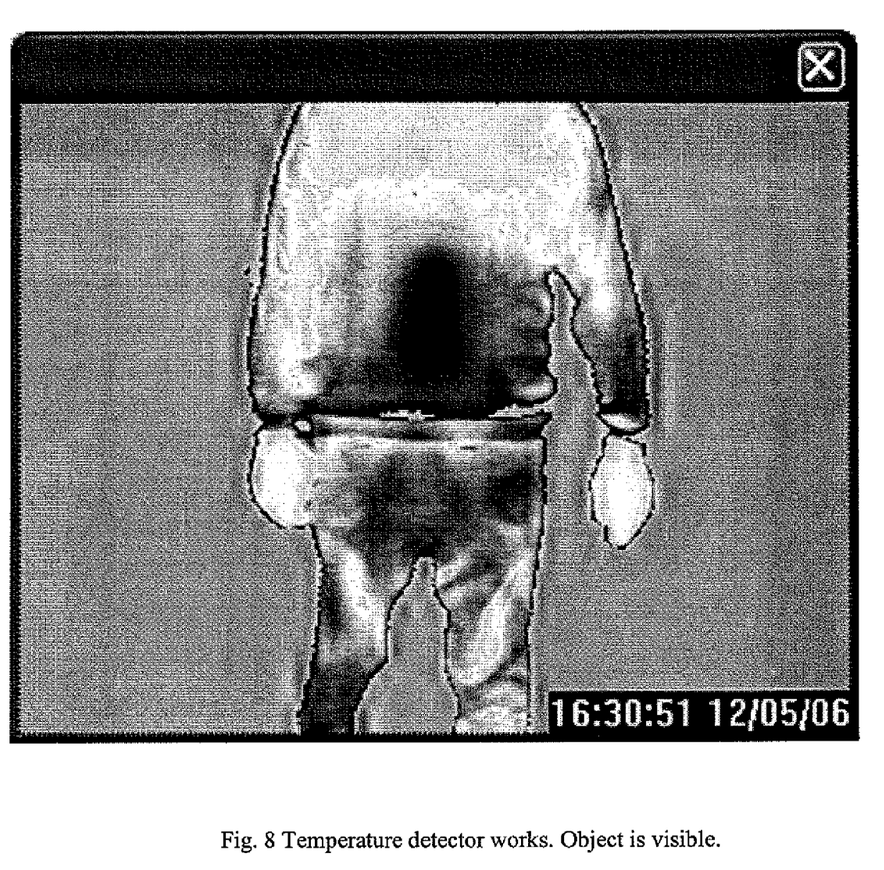

FIGS. 7 and 8 illustrate the results obtained from the Temperature Motion Detector 130.

In the embodiment shown in FIG. 4, from the raw (substantially unfiltered) image in FIG. 7, a region of interest can be selected including substantially and mostly the region with increased intensity (corresponding to increased temperature) and that comprises the body. (In one instance, the region can be selected by techniques such as, but not limited to, edge detection.) The selected region has, on the average, an intensity (temperature) that is indicative of the body. Contrast enhancement, and/or other techniques, can be applied to the selected region in order to obtain the results shown in FIG. 8.

Figure 9:
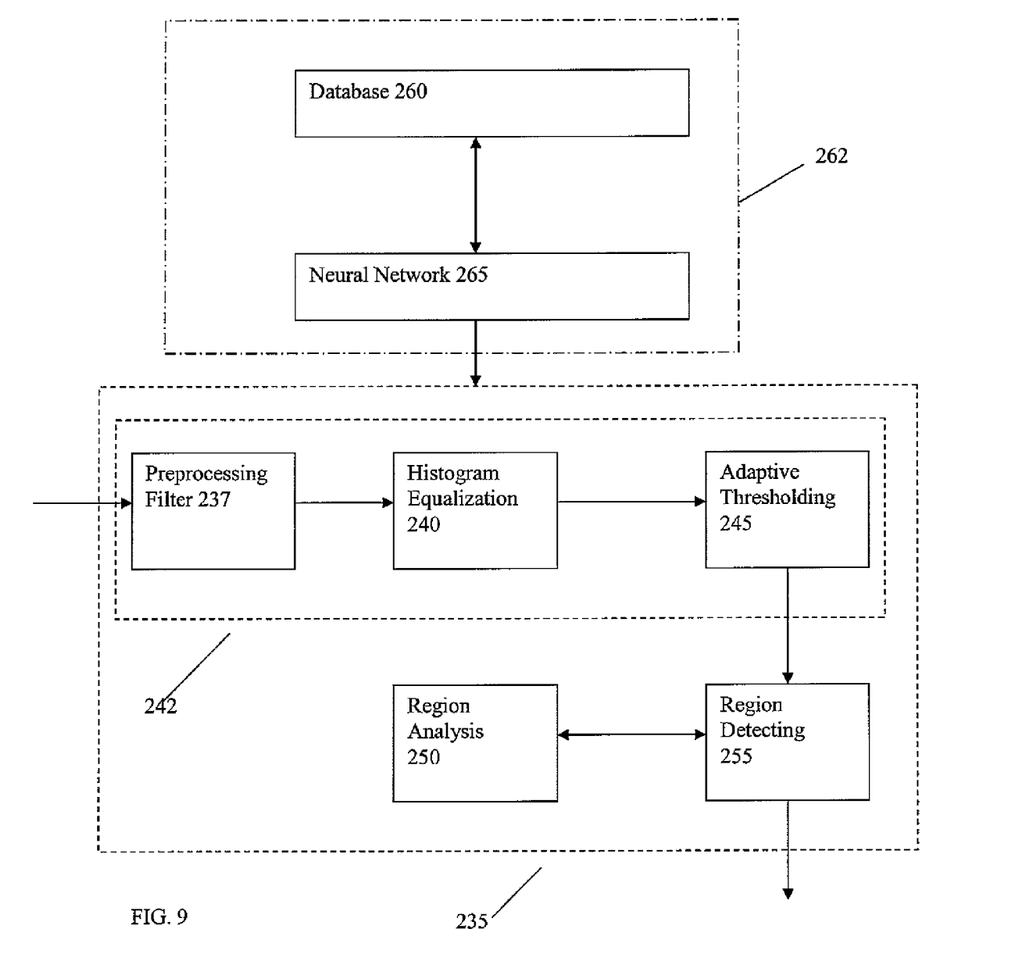
FIG. 9 is a schematic block diagram representation of an embodiment the image processing component of systems of these teachings.

Application of the contrast detection and related image processing techniques disclosed in US Patent publication number 20070122038 to the embodiment shown in FIG. 4 is shown in FIG. 9 (from FIG. 3 of US Patent publication number 20070122038). Referring to FIG. 9, the system shown therein also includes an analysis component 235 receiving one or more images from the one or more image acquisition devices 35. The analysis component 235 is capable of identifying one or more regions in the one or more images. The color image, obtained from the target image processor 150, having the one or more regions identified is then provided to the display 160.

In one instance, the analysis component 235 is also capable of enhancing an image attribute in the one or more regions. Exemplary embodiments of the image attribute are, but this invention is not limited only to this embodiments, contrast or color.

Referring to FIG. 9, the embodiment shown therein includes a pre-processing component 242 capable of enhancing detectability of the one or more regions in the one or more images received from the acquisition device 35. The embodiment shown in FIG. 9 also includes a region detecting component 255 capable of identifying the one or more regions in the one or more preprocessed images and a region analysis component 250 capable of determining characteristics of the one or more regions. In one instance, but this invention is not limited to only this embodiment, the characteristics include moment invariants.

In the embodiment shown in FIG. 9, the preprocessing component 242 includes a noise reduction component 237 capable of increasing a signal to noise ratio in the one or more images and a contrast enhancing component. The contrast enhancing component, in the embodiment shown in FIG. 9, includes a histogram equalization component 240 (see, for example, W. K. Pratt, Digital image Processing, ISBN0-471-01888-0, pp. 311-318, which is incorporated by reference herein in its entirety) and an adaptive thresholding component 245 capable of binarizing an output of the histogram equalization component 240. (For adaptive thresholding, see, for example, but not limited to, Ø. D. Trier and T. Taxt, Evaluation of binarization methods for document images, available at http://citeseer.nj.nec.com/trier95evaluation.html, also a short version published in IEEE Transaction on Pattern Analysis and Machine Intelligence, 17, pp. 312-315, 1995, both of which are incorporated by reference herein in their entirety.) it should be noted that histograms can also be used for segmentation, and therefore for detecting a region. In one embodiment, the binary output of the histogram equalization component is downsampled to obtain a downsampled image (in order to save processing time of the region detecting component 255). In one instance, the noise reduction component 237 is an adaptive noise reduction filter such as, but not limited to, a wavelet based noise reduction filter (see, for example, Mukesh Motwani, Mukesh Gadiya, Rakhi Motwani, and Frederick C. Harris, Jr., "A Survey of Image Denoising Techniques," in Proceedings of GSPx 2004, Sep. 27-30, 2004, Santa Clara Convention Center, Santa Clara, Calif., and Scheunders P., Denoising of multispectral images using wavelet thresholding.—Proceedings of the SPIE Image and Signal Processing for Remote Sensing IX, 2003, p. 28-35, both of which are incorporated by reference herein).

In one instance of the embodiment shown in FIG. 9, the region detecting component 255 includes segmentation to identify the one or more regions. (See for example, but not limited to, Ch. 9, Image Segmentation, in Handbook of Pattern Recognition and Image Processing, ISBN 0-121-774560-2, which is incorporated by reference herein in its entirety, C. Kervrann and F. Heitz, "A Markov random field model based approach to unsupervised texture segmentation using local and global spatial statistics," IEEE Transactions on Image Processing, vol. 4, no. 6, 1995, 856-862, http://citeseer.ist.psu.edu/kervrann93markov.html, which is incorporated by reference herein in its entirety, and S. Liapis and E. Sifakis and G. Tziritas, "Colour and Texture Segmentation Using Wavelet Frame Analysis, Deterministic Relaxation, and Fast Marching Algorithms," http://citeseer.ist.psu.edu/liapis04colour.html, which is incorporated by reference herein in its entirety.) In one embodiment, the region detecting component 255 labels each connective area (region) by unique label. Each region labeled is processed by the region analysis component 250 in order to determine shape characteristics (moment invariants, in one embodiment).

In one instance of the embodiment shown in FIG. 9, in the region analysis component 250, the characteristics include moment invariants (see for example, Keyes, Laura and Winstanley, Adam C. (2001) USING MOMENT INVARIANTS FOR CLASSIFYING SHAPES ON LARGE_SCALE MAPS. Computers, Environment and Urban Systems 25. available at http://eprints.may.ie/archive/00000064/, which is incorporated by reference herein in its entirety). In the embodiment in which shape characteristics are important for object detection, the moments will identify concealed objects. (For example, circled objects have all moments starting from the second equal zero. Symmetrical objects have specific moments, etc.) Other embodiments of the characteristics obtained from the region analysis component 50 include, but are not limited to, multiscale fractal dimension and contour saliences, obtained using the image foresting transform, fractal dimension and Fourier descriptors (see for example, R. Torres, A. Falcao, and L. Costa. A graph-based approach for multiscale shape analysis. Pattern Recognition, 37(6):1163-1174, 2004, available at http://citeseer.ist.psu.edu/torres03graphbased.html, which is incorporated by reference herein in its entirety).

In one instance, if a region with given characteristics (a given moment) values is detected, the region provided to the one or more displays 60 is enhanced by contrast.

In one instance, in the embodiments described above, some of the elements of the analysis component 235, such as, but not limited to, the noise reduction filter 237, histogram equalization component 240, the adaptive thresholding component 45, or/and the unsupervised segmentation component 255, are adaptive. Adaptation can be accomplished or enhanced by means of an adaptation component 262. In one embodiment, the adaptation component 62 includes a database 60 (in one instance, a computer usable medium for storing data for access by a computer readable code, the computer usable medium including a data structure stored in the computer usable medium, the data structure including information resident in a database, referred to as "a database") and a neural network component 265. It should be noted that although the embodiment shown in FIG. 9 utilizes a neural network for the adaptation (including optimizing of parameters), other methods of optimization are also within the scope of this invention. The adaptation component 262 can, in one embodiment, include a component utilizing artificial intelligence or decision logic (including fuzzy decision logic). In one embodiment, substantially optimal parameters of some of the elements of the analysis component 235, such as, but not limited to, the noise reduction filter 237, histogram equalization component 240, the adaptive thresholding component 245, or/and the unsupervised segmentation component 255, are determined (within a training procedure) by means of the neural network 265 and the database 60.

Figure 10:
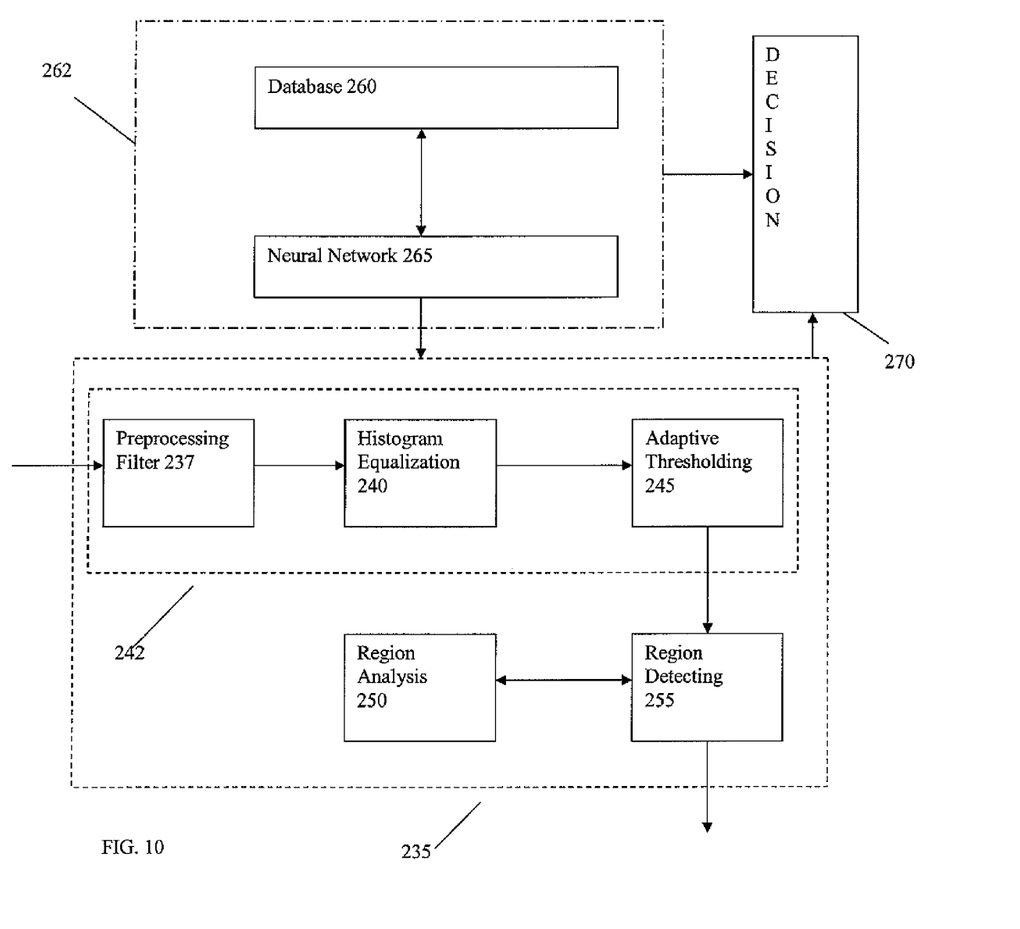
FIG. 10 is a schematic block diagram representation of another embodiment the image processing component of systems of these teachings.

FIG. 10 (from FIG. 4 of US Patent publication number 20070122038) shows another block diagram representation of an embodiment of the analysis component 235. Referring to FIG. 10, the output of the region processing component 255 including the shape characteristics (moment invariants) and input from an optimizing component (the neural network) and the database are provided to a decision component 270. The decision component 270 can be, but is not limited to, a component utilizing artificial intelligence or another neural network or decision logic (including fuzzy decision logic) (see for example, O. D. Trier, A. K. Jain and T. Taxt, "Feature extraction methods for character recognition—A survey," Pattern Recognition 29, pp. 641-662, 1996, available at http://citeseer.ist.psu.edu/trier95feature.html, which is incorporated by reference herein in its entirety, Fernando Cesar C. De Castro et al, "Invariant Pattern Recognition of 2D Images Using Neural Networks and Frequency-Domain Representation," available at http://citeseer.ist.psu.edu/29898.html, which is also incorporated by reference herein in its entirety). The decision component 270, in one embodiment, can supplement or replace the display 160.

It should be noted that the above disclosed techniques are presented to give a range of options available in detecting a region, not all the above techniques need to be applied in a single embodiment. Combinations of the above disclosed techniques can also be utilized.

Referring again to FIG. 4, the correlation motion detector 120 also receives the raw image. As in the temperature motion detector 130, from the raw (substantially unfiltered) image, a region of interest can be selected including substantially and mostly the region with increased intensity (corresponding to increased temperature) and that comprises the body. The image of that selected region of interest can be utilized in subsequent raw images in order to identify the body (and concealed object) by selecting the region that substantially maximizes the correlation with the image of the previously selected region. The combination of the correlation motion detector 120 and the temperature motion detector 130 can be used to identify the body (and concealed object) and extract a part of the image corresponding to substantially the body in subsequent images. The combination of the correlation motion detector 120 and the temperature motion detector 130 can also be utilized to extract a part of the image corresponding to substantially the body (and concealed object) and to substantially remove the background. (In one instance, both the correlation and the identified region of enhanced temperature can be used to extract the part of the image corresponding substantially to the body and concealed object.) After the background as the substantially removed from the extracted image, the contrast between the body and the concealed object can be enhanced.

In one embodiment, the two "Motion detectors" 120, 130, the Color Infrared Composer 140, and the Target Investigation Processor 150 are implemented by means of one or more processors and one or more computer usable media having computer readable code embodied therein that causes the one or more processors to perform the functions of the two "Motion detectors" 120, 130, the Color Infrared Composer 140, and the Target Investigation Processor 150. This implementation is labeled as computer 110 in FIG. 4.

Although in the embodiment described above the region of interest is selected from the substantially unfiltered ("raw") image, embodiments of these teachings also include embodiments in which the temperature detector 130 and the correlation detector 120 are combined with the color infrared composer 140. In those embodiments the region of interest is obtained by segmenting the color image (see for example, but not limited to, Coleman, G. B, Andrews, H. C., Image segmentation by clustering, Proceedings of the IEEE, Volume 67, Issue 5, May 1979 Page(s):773-785 and Lucchese, L., Mitra, S. K, Unsupervised segmentation of color images based on k-means clustering in the chromaticity plane, Proceedings. IEEE Workshop on Content-Based Access of Image and Video Libraries, 1999 (CBAIVL '99), 1999, Pages: 74-78, both of which incorporated by reference herein in their entirety, and references provided therein).

The image analysis subsystems, including the "correlation motion detector," the "temperature motion detector" and the "color composer" can be implemented utilizing a computer readable code embodied in a computer usable or readable medium and one or more processors.

In the above described embodiments, the filter assembly of FIG. 3 or color filters implemented on the image acquisition device comprise means for separating electromagnetic radiation received from a body into at least three components, each one component of three of the at least three components corresponding to a response to a non-visible analogue to one human vision spectral response from three human vision spectral responses (a wavelength of the electromagnetic radiation being in a non-visible range). A camera, such as an infrared camera or a detector such as in infrared detector (in one instance, a device in which at every pixel a capacitance varies according to the received infrared radiation) or any of a variety of image acquisition devices (such as COD's) comprise image acquisition means in the embodiments disclosed above. One of the number of the region identification methods disclosed above and one or more processors or computer readable or usable media having computer readable code embodied therein that causes the water more processors to implement the method comprise means for identifying at least one region in at least one image in the above described embodiments. One more processors and computer usable media having computer readable code embodied therein for receiving the three components corresponding to responses to a nonvisible analogue to the human vision spectral responses, converting the nonvisible analogue to visible human vision spectral responses and generating a color image comprise means for obtaining a color image in the above described embodiments.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. From a technological standpoint, a signal or carrier wave (such as used for Internet distribution of software) encoded with functional descriptive material is similar to a computer-readable medium encoded with functional descriptive material, in that they both create a functional interrelationship with a computer. In other words, a computer is able to execute the encoded functions, regardless of whether the format is a disk or a signal.

It should be noted that although the present teachings are illustrated by an exemplary embodiment operating in a given range of infrared radiation, the present teachings are not limited only to that embodiment.

Although these teachings have been described with respect to various embodiments, it should be realized these teachings is also capable of a wide variety of further and other embodiments within the spirit and scope of the appended claims.

What is claimed is:

1. A system for detecting concealed objects, the system comprising:

a spectral decomposition subsystem receiving electromagnetic radiation from a body and separating the received electromagnetic radiation into at least three components, each one component of three of said at least three components corresponding to a response to a non-visible analogue to one human vision spectral response from three human vision spectral responses; a wavelength of said electromagnetic radiation being in a non-visible range;

an image acquisition sub-system receiving electromagnetic radiation from the specter of decomposition subsystem; and an analysis subsystem receiving said at least three components, identifying at least one region in an image obtained from at least one said at least three components and providing a color image, the color image obtained from a visible equivalent of the non-visible analogue; the at least one region of the color image enabling detection of a concealed object.

2. The system of claim 1 wherein said spectral decomposition subsystem comprises a filter assembly comprising at least three filters, said filter assembly movable to place one of said at least three filters in an optical path between the body and said image acquisition sub-system;

each one filter of three of said at least three filters corresponding to the non-visible analogue of one human vision spectral response from the three human vision spectral responses.

3. The system of claim 1 wherein said analysis subsystem further comprises:

a region detecting component identifying at least one regions in an image obtained from an output of said image acquisition sub-system.

4. The system of claim 3 wherein said spectral decomposition subsystem separates the received electromagnetic radiation into four components, said fourth component being substantially unattenuated;
   and wherein said image is obtained from said substantially unattenuated component.

5. The system of claim 1 wherein the received electromagnetic radiation is in a far infrared range of about 8 to about 14 microns in wavelength.

6. The system of claim 5 wherein a maximum of a filter separating one component of said at least three components corresponding to a response to a non-visible analogue to a green component of human vision spectral sensitivity is located at about 10.5 microns.

7. The system of claim 4 wherein said analysis subsystem comprises a contrast detection subsystem;

said contrast detection subsystem comprising said region detecting component.

8. The system of claim 7 wherein said analysis subsystem further comprises a correlation subsystem; said correlation subsystem also receiving said image; said correlation subsystem obtaining a correlation of said at least one region with subsequently acquired images.

9. A method for detecting concealed objects, the method comprising the steps of:

separating, utilizing a spectral decomposition device, electromagnetic radiation received from a body into at least three components, each one component of three of said at least three components corresponding to a response to a non-visible analogue to one human vision spectral response from three human vision spectral responses; a wavelength of said electromagnetic radiation being in a non-visible range;

acquiring, utilizing an image acquisition device, at least one image from the separated electromagnetic radiation;

identifying, utilizing an analysis subsystem, at least one region in the at least one image; and obtaining a color image from a visible equivalent of the non-visible analogue to human vision spectral response;

the color image obtained from a visible equivalent of the non-visible analogue; the at least one region of the color image enabling detection of a concealed object.

10. The method of claim 9 wherein the step of separating electromagnetic radiation received from the body comprises the step of separating the received electromagnetic radiation into four components, the fourth component being substantially unattenuated; and wherein the at least one region is identified in an image obtained from the substantially unattenuated component.

11. The method of claim 9 wherein the received electromagnetic radiation is in a far infrared range of about 8 to about 14 microns in wavelength.

12. The method of claim 9 wherein the step of separating electromagnetic radiation received from the body comprises the step of providing a filter assembly;

said filter assembly filter assembly comprising at least three filters, said filter assembly movable to place one of said at least three filters in an optical path between the body and an image acquisition sub-system;

each one filter of three of said at least three filters corresponding to the non-visible analogue of one human vision spectral response from the three human vision spectral responses.

13. The method of claim 12 wherein the received electromagnetic radiation is in a far infrared range of about 8 to about 14 microns in wavelength.

14. The method of claim 13 wherein a maximum of a filter separating one component of said at least three components corresponding to a response to a non-visible analogue to a green component of human vision spectral sensitivity is located at about 10.5 microns.

15. The method of claim 10 wherein the step of identifying the at least one region comprises the step of detecting contrast in the image.

16. The method of claim 15 further comprises the step of obtaining a correlation of the at least one region with subsequently acquired images.

17. A system for detecting concealed objects, the system comprising:

means for separating electromagnetic radiation received from a body into at least three components, each one component of three of said at least three components corresponding to a response to a non-visible analogue to one human vision spectral response from three human vision spectral responses; a wavelength of said electromagnetic radiation being in a non-visible range;

means for acquiring at least one image from the separated electromagnetic radiation;

means for identifying at least one region in the at least one image; and means for obtaining a color image from a visible equivalent of the non-visible analogue to human vision spectral response.

\* \* \* \* \*